US012340043B2

(12) United States Patent
Fang

(10) Patent No.: US 12,340,043 B2
(45) Date of Patent: Jun. 24, 2025

(54) TOUCH CONTROL DISPLAY PANEL AND TOUCH CONTROL DISPLAY DEVICE

(71) Applicants: Wuhan China Star Optoelectronics Technology Co., Ltd., Hubei (CN); Wuhan China Star Optoelectronics Semiconductor Display Technology Co., Ltd., Hubei (CN)

(72) Inventor: Liang Fang, Hubei (CN)

(73) Assignees: Wuhan China Star Optoelectronics Technology Co., Ltd., Wuhan (CN); Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/289,795

(22) PCT Filed: Apr. 15, 2021

(86) PCT No.: PCT/CN2021/087437
§ 371 (c)(1),
(2) Date: Jun. 12, 2024

(87) PCT Pub. No.: WO2022/205510
PCT Pub. Date: Oct. 6, 2022

(65) Prior Publication Data
US 2025/0044892 A1     Feb. 6, 2025

(30) Foreign Application Priority Data
Apr. 2, 2021   (CN) .......................... 202110362850.6

(51) Int. Cl.
  *G06F 3/041*   (2006.01)
  *G06F 3/044*   (2006.01)

(52) U.S. Cl.
  CPC .......... *G06F 3/0416* (2013.01); *G06F 3/0446* (2019.05); *G06F 2203/04112* (2013.01)

(58) Field of Classification Search
  CPC ................ G06F 3/0416; G06F 3/0446; G06F 2203/04112; G06F 3/0412; G06F 3/04164
  See application file for complete search history.

(56) References Cited

U.S. PATENT DOCUMENTS

| 11,257,891 | B2 * | 2/2022 | Yi ........................ H10K 59/131 |
| 12,193,307 | B2 * | 1/2025 | Zhao ..................... H10K 59/131 |
| 2010/0025690 | A1 * | 2/2010 | Kim ..................... H10D 86/441 |
| | | | 257/E21.414 |
| 2012/0262382 | A1 * | 10/2012 | Guard ................... G06F 3/0446 |
| | | | 345/173 |

(Continued)

FOREIGN PATENT DOCUMENTS

| CN | 105487719 | 4/2016 |
| CN | 106293255 | 1/2017 |

(Continued)

*Primary Examiner* — Amy Onyekaba

(57) ABSTRACT

A touch control display panel and a touch control display device are provided. In the touch control display panel, an area of an overlapping area between a touch control signal line and a wire can be reduced. Therefore, signal interference between the touch control signal line and the wire is reduced, and display performance and touch control performance of the touch control display panel are in turn enhanced.

20 Claims, 7 Drawing Sheets

(56) References Cited

U.S. PATENT DOCUMENTS

| | | | |
|---|---|---|---|
| 2014/0042406 A1* | 2/2014 | Degner | H10K 77/111 |
| | | | 438/34 |
| 2017/0097713 A1* | 4/2017 | Jin | G02F 1/1339 |
| 2017/0237027 A1* | 8/2017 | Lee | H10K 59/40 |
| | | | 257/40 |
| 2019/0095007 A1* | 3/2019 | Jeong | H10K 59/131 |
| 2019/0129532 A1* | 5/2019 | Zhao | G06F 3/04166 |
| 2019/0212855 A1* | 7/2019 | Shang | G06F 3/04164 |
| 2020/0142538 A2* | 5/2020 | Wang | G06F 3/0446 |
| 2020/0183240 A1* | 6/2020 | Hsieh | G02F 1/1345 |
| 2021/0082962 A1* | 3/2021 | Cui | H10D 86/443 |
| 2021/0118958 A1* | 4/2021 | Park | H10K 59/131 |
| 2021/0124206 A1* | 4/2021 | Li | G02F 1/13338 |
| 2021/0333942 A1* | 10/2021 | Zhang | G06F 3/0445 |
| 2022/0005878 A1* | 1/2022 | Lee | G06F 3/0412 |
| 2022/0300114 A1* | 9/2022 | Wang | G06F 3/0412 |
| 2023/0024214 A1* | 1/2023 | Tong | H10K 59/122 |
| 2023/0350516 A1* | 11/2023 | Wang | G06F 3/044 |

FOREIGN PATENT DOCUMENTS

| | | |
|---|---|---|
| CN | 108549170 | 9/2018 |
| CN | 111427469 | 7/2020 |
| CN | 111427480 | 7/2020 |
| JP | 2011-008757 | 1/2011 |
| JP | 2017-054926 | 3/2017 |

\* cited by examiner

TOUCH CONTROL DISPLAY PANEL AND TOUCH CONTROL DISPLAY DEVICE

RELATED APPLICATIONS

This application is a National Phase of PCT Patent Application No. PCT/CN2021/087437 having International filing date of Apr. 15, 2021, which claims the benefit of priority of Chinese Patent Application No. 202110362850.6 filed on Apr. 2, 2021. The contents of the above applications are all incorporated by reference as if fully set forth herein in their entirety.

FIELD AND BACKGROUND OF THE INVENTION

The present disclosure relates to the field of display and more particularly, to a touch control display panel and a touch control display device.

Nowadays, touch control display panels are one of the most popular display panels. Among them, capacitive touch control display panels have relatively wide applications. Self-capacitive touch control display panels, which realize a touch control function by a metal layer, are the most widely used among the capacitive touch control display panels. In touch control panels, a touch control signal line extends from a display area to a fan-shaped wire area, thereby realizing signal transmission between a touch control sensing block and a touch control integrated circuit. As such, the touch control signal line and an array wire overlap each other in the fan-shaped wire area, leading to signal interference, such as noise, between the touch control signal line and the wire. Therefore, display performance and touch control performance of touch control display panels are compromised.

SUMMARY OF THE INVENTION

The present disclosure provides a touch control display panel and a touch control display device to solve a following issue: signal interference between a touch control signal line and a wire leads to reduction of display performance and touch control performance of the touch control display panel.

An embodiment of the present disclosure provides a touch control display panel, including a display area and a fan-shaped wire area defined at an end of the display area, wherein the touch control display panel includes:
 a substrate;
 a wire disposed on a side of the substrate, wherein part of the wire is disposed in the fan-shaped wire area; and
 a touch control signal line disposed on a side of the wire away from the substrate, wherein part of the touch control signal line is disposed in the fan-shaped wire area, and the touch control signal line overlaps the wire in the fan-shaped wire area;
 wherein an overlapping area between the touch control signal line and the wire includes at least one hollow part configured to reduce an area of the overlapping area between the touch control signal line and the wire.

In an embodiment of the present disclosure, when the at least one hollow part is disposed at a lateral edge of the touch control signal line, a length of the at least one hollow part along an extending direction of the touch control signal line is greater than or equal to a width of the wire.

When the at least one hollow part is disposed at a lateral edge of the wire, a length of the at least one hollow part along an extending direction of the wire is greater than or equal to a width of the touch control signal line.

In an embodiment of the present disclosure, the at least one hollow part includes a plurality of sub-hollow parts disposed at a lateral edge of the touch control signal line and arranged along an extending direction of the touch control signal line; or the sub-hollow parts are disposed at a lateral edge of the wire and arranged along an extending direction of the wire.

In an embodiment of the present disclosure, a shape of the sub-hollow parts is a circular shape, an elliptical shape, or a regular polygonal shape.

In an embodiment of the present disclosure, an extending direction of the wire is a first direction, and an extending direction of the touch control signal line is a second direction, and an angle between the first direction and the second direction ranges from 0° to 180°.

In an embodiment of the present disclosure, when the hollow parts are respectively disposed at two sides of the touch control signal line respectively and are arranged opposite to each other, a vertical distance between the corresponding hollow parts along an extending direction of the touch control signal line is greater than or equal to 2 μm.

When the hollow parts are respectively disposed at two sides of the wire and are arranged opposite to each other, a vertical distance between corresponding the corresponding hollow parts along an extending direction of the wire is greater than or equal to 2 μm.

In an embodiment of the present disclosure, the wire is a data signal line, a driving signal line, or a gate timing control line.

In an embodiment of the present disclosure, the touch control display panel further includes an insulating layer disposed between the wire and the touch control signal line.

In an embodiment of the present disclosure, the touch control display panel further includes an encapsulation layer disposed between the wire and the insulating layer.

In an embodiment of the present disclosure, the touch control display panel further includes a touch control sensing block and a touch control integrated circuit, wherein the touch control sensing block is disposed in the display area and is disposed on the side of the wire away from the substrate, the touch control signal line and the touch control sensing block are disposed on a same layer, the touch control integrated circuit is disposed in the fan-shaped wire area, the touch control signal line and the touch control sensing block have a one-to-one correspondence, and the touch control signal line is connected to the touch control sensing block and the touch control integrated circuit.

An embodiment of the present disclosure further provides a touch control display device, including a touch control display panel. The touch control display panel includes:
 a substrate;
 a wire disposed on a side of the substrate, wherein part of the wire is disposed in the fan-shaped wire area; and
 a touch control signal line disposed on a side of the wire away from the substrate, wherein part of the touch control signal line is disposed in the fan-shaped wire area, and the touch control signal line overlaps the wire in the fan-shaped wire area;
 wherein an overlapping area between the touch control signal line and the wire includes at least one hollow part configured to reduce an area of the overlapping area between the touch control signal line and the wire.

In an embodiment of the present disclosure, the touch control display device further includes the touch control display panel. When the at least one hollow part is disposed at a lateral edge of the touch control signal line, a length of the at least one hollow part along an extending direction of the touch control signal line is greater than or equal to a width of the wire.

When the at least one hollow part is disposed at a lateral edge of the wire, a length of the at least one hollow part along an extending direction of the wire is greater than or equal to a width of the touch control signal line.

In an embodiment of the present disclosure, the touch control display device includes the touch control display panel. The at least one hollow part includes a plurality of sub-hollow parts disposed at a lateral edge of the touch control signal line and arranged along an extending direction of the touch control signal line; or the sub-hollow parts are disposed at a lateral edge of the wire and arranged along an extending direction of the wire.

In an embodiment of the present disclosure, the touch control display device includes the touch control display panel. A shape of the sub-hollow parts is a circular shape, an elliptical shape, or a regular polygonal shape.

In an embodiment of the present disclosure, the touch control display device includes the touch control display panel. An extending direction of the wire is a first direction, and an extending direction of the touch control signal line is a second direction, and an angle between the first direction and the second direction ranges from 0° to 180°.

In an embodiment of the present disclosure, the touch control display device includes the touch control display panel. When the hollow parts are respectively disposed at two sides of the touch control signal line respectively and are arranged opposite to each other, a vertical distance between the corresponding hollow parts along an extending direction of the touch control signal line is greater than or equal to 2 μm.

When the hollow parts are respectively disposed at two sides of the wire and are arranged opposite to each other, a vertical distance between the corresponding hollow parts along an extending direction of the wire is greater than or equal to 2 μm.

In an embodiment of the present disclosure, the touch control display device includes the touch control display panel. The wire is a data signal line, a driving signal line, or a gate timing control line.

In an embodiment of the present disclosure, the touch control display device includes the touch control display panel. The touch control display panel further includes an insulating layer disposed between the wire and the touch control signal line.

In an embodiment of the present disclosure, the touch control display device includes the touch control display panel. The touch control display panel further includes an encapsulation layer disposed between the wire and the insulating layer.

In an embodiment of the present disclosure, the touch control display device includes the touch control display panel. The touch control display panel further includes a touch control sensing block and a touch control integrated circuit, wherein the touch control sensing block is disposed in the display area and is disposed on the side of the wire away from the substrate, the touch control signal line and the touch control sensing block are disposed on a same layer, the touch control integrated circuit is disposed in the fan-shaped wire area, the touch control signal line and the touch control sensing block have a one-to-one correspondence, and the touch control signal line is connected to the touch control sensing block and the touch control integrated circuit.

Regarding the beneficial effects: the present disclosure provides a touch control display panel and a touch control display device. The touch control display panel includes a display area and a fan-shaped wire area. The fan-shaped wire area is defined at an end of the display area. The touch control display panel includes a substrate, a wire, and a touch control signal line. The wire is disposed on a side of the substrate. Part of the wire is disposed in the fan-shaped wire area. The touch control signal line is disposed on a side of the wire away from the substrate. Part of the touch control signal line is disposed in the fan-shaped wire area. The touch control signal line overlaps the wire in the fan-shaped wire area. Wherein, an overlapping area between the touch control signal line and the wire includes at least one hollow part configured to reduce an area of the overlapping area between the touch control signal line and the wire. In the touch control display panel provided by the present disclosure, an area of the overlapping area between the touch control signal line and the wire can be reduced. Therefore, signal interference between the touch control signal line and the wire can be reduced, and display performance and touch control performance of the touch control display panel can in turn be enhanced.

BRIEF DESCRIPTION OF THE SEVERAL VIEWS OF THE DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which those skilled in the art can derive further figures without making any inventive efforts.

DESCRIPTION OF SPECIFIC EMBODIMENTS OF THE INVENTION

The following description of the various embodiments is provided with reference to the accompanying drawings to demonstrate that the embodiments of the present disclosure may be implemented.

The present disclosure is illustrated in detail below with reference to specific embodiments.

Figure 1:
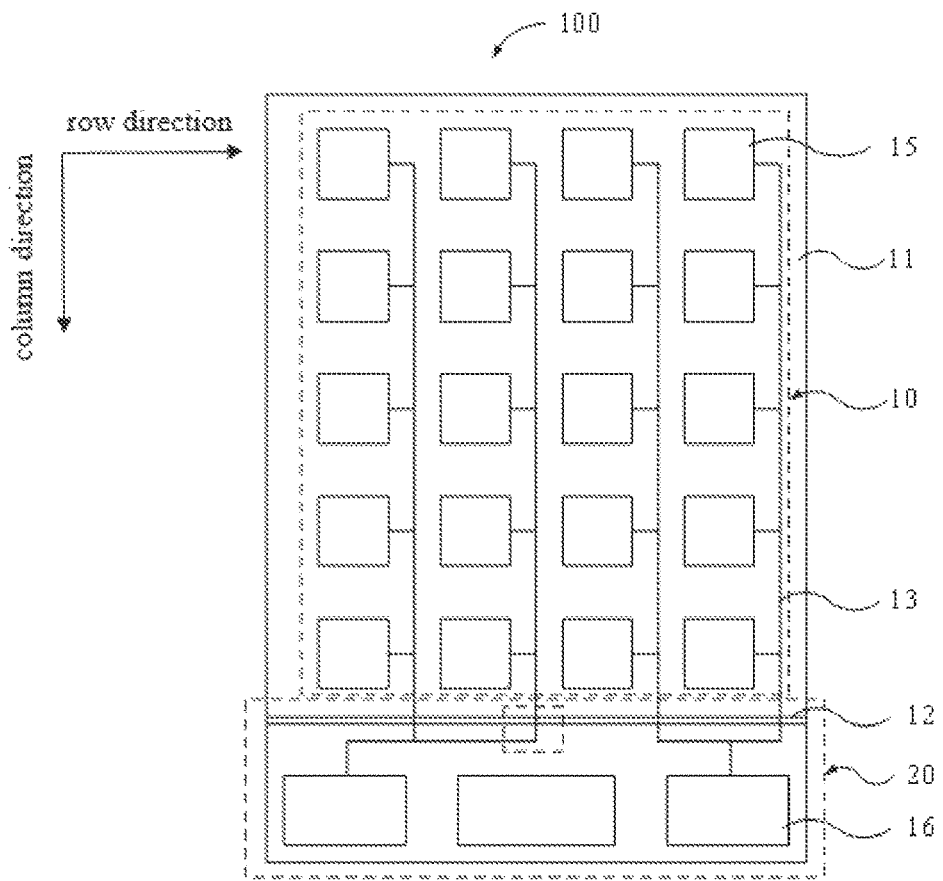
FIG. 1 is a top view showing a touch control display panel provided by the present disclosure according to a first embodiment.
Figure 2:
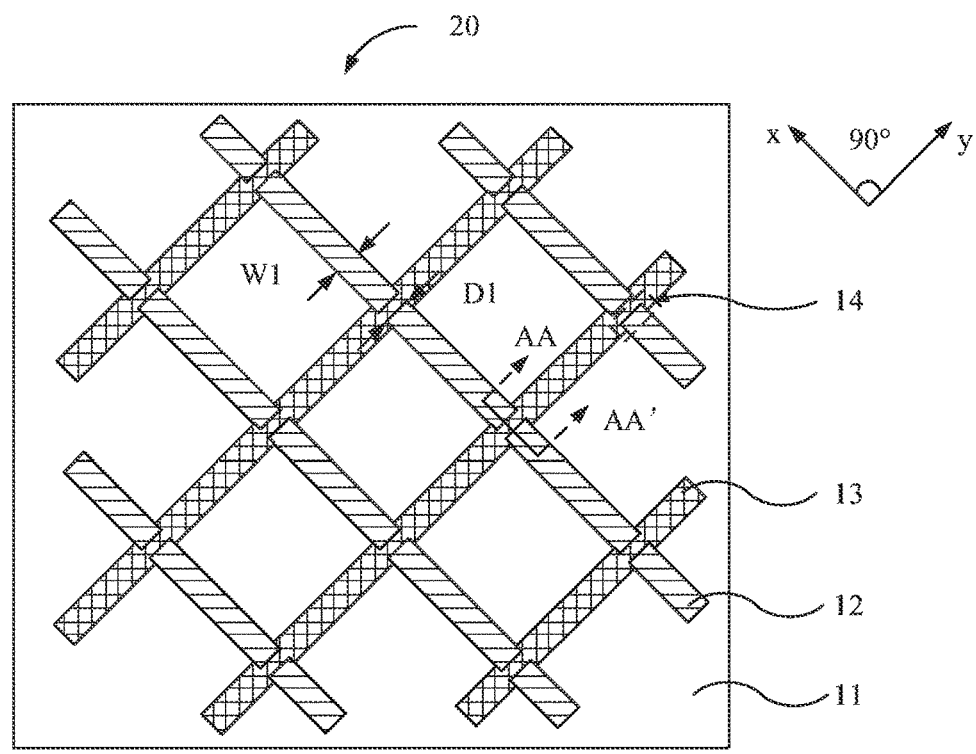
FIG. 2 is a partially enlarged view showing part of the touch control display panel provided by the present disclosure according to the first embodiment.
Figure 3:
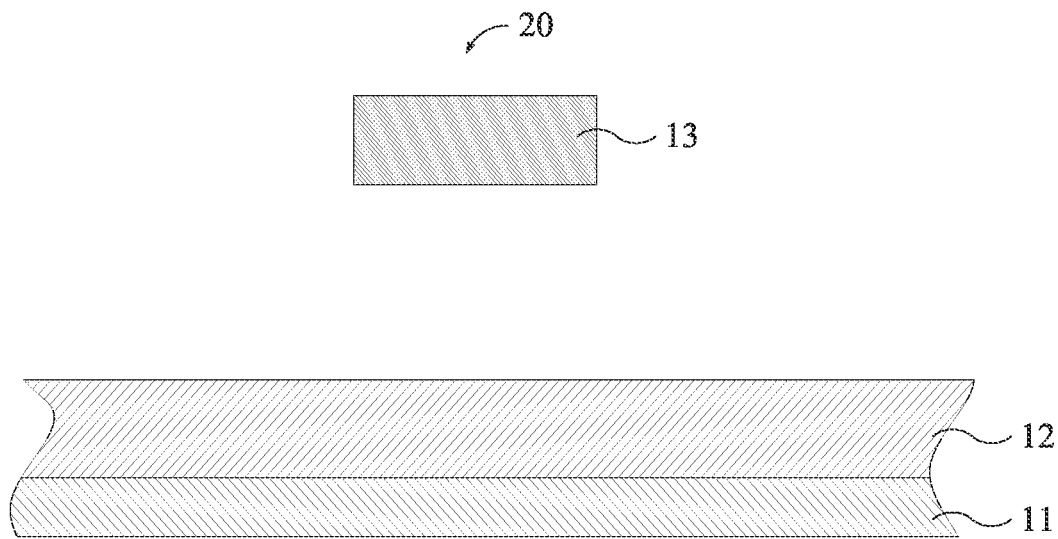
FIG. 3 is a cross-sectional view showing the touch control display panel provided by the present disclosure according to the first embodiment taken along line AA-AA'.

Please refer to FIGS. 1-3. FIG. 1 is a top view showing a touch control display panel provided by the present disclosure according to a first embodiment. FIG. 2 is a partially enlarged view showing part of the touch control display panel provided by the present disclosure according to the first embodiment. FIG. 3 is a cross-sectional view showing the touch control display panel provided by the present disclosure according to the first embodiment taken along line AA-AA'.

An embodiment of the present disclosure provides a touch control display panel 100. The touch control display panel 100 includes a display area 10 and a fan-shaped wire area 20. The fan-shaped wire area 20 is located at an end of the display area 10. The touch control display panel 100 includes a substrate 11, a wire 12, and a touch control signal line 13. The wire 12 is disposed on a side of the substrate 11. Part of the wire 12 is disposed in the fan-shaped wire area 20. The touch control signal line 13 is disposed on a side of the wire 12 away from the substrate 11. Part of the touch control signal line 13 is disposed in the fan-shaped wire area 20. The touch control signal line 13 overlaps the wire 12 in the fan-shaped wire area 20. Wherein, an overlapping area between the touch control signal line 13 and the wire 12 includes at least one hollow part 14 configured to reduce an area of the overlapping area between the touch control signal line 13 and the wire 12.

It can be understood that a number of the at least one hollow part 14 in the overlapping area between the touch control signal line 13 and the wire 12 may be one, two, three, four, or more. In the present disclosure, the number of the at least one hollow part 14 in the overlapping area between the touch control signal line 13 and the wire 12 is not limited. The substrate 11 may be a glass substrate or an array substrate. In the present disclosure, a material of the substrate 11 is not limited. Specifically, the wire 12 may be a data signal line, a driving signal line, or a gate timing control line. It can be understood that the data signal line, the driving signal line, or the gate timing control line would generate an alternating signal. When the data signal line, the driving signal line, or the gate timing control line overlaps the touch control signal line 13, a touch control signal would be interfered with, affecting display performance and touch control performance of the touch control display panel 100. The touch control signal line 13 may be formed from alloys including Ti/Al/Ti or Mo/Al/Mo. Therefore, the control signal line 13 can not only be prevented from oxidation but also have improved bending resistance.

The touch control signal line 13 overlaps the wire 12 in the fan-out wire area 20. Signal interference would occur due to coupling capacitance generated between the touch control signal line 13 and the wire 12, further affecting display performance and touch control performance of the touch control display panel 100. In the present disclosure, the touch control signal line 13 or the wire 12 in the overlapping area includes the at least one hollow part 14 configured to reduce the area of the overlapping area between the touch control signal line 13 and the wire 12. Therefore, signal interference between the touch control signal line 13 and the wire 12 can be reduced, and display performance and touch control performance of the touch control display panel 100 can in turn be enhanced. It can be understood that a capacitance calculation formula is as follows: $C=\varepsilon S/(4\pi kd)$, wherein s is a dielectric constant of a medium between two electrodes, S is a facing area of two plates of a capacitor, $\pi$ is Pi, and d is a distance between two plates of the capacitor. According to the above-mentioned capacitance calculation formula, the less the S, the less the C. Therefore, C can be reduced by reducing S. In the present disclosure, the touch control signal line 13 or the wire 12 in the overlapping area includes the at least one hollow part 14 configured to reduce a facing area of the overlapping area between the touch control signal line 13 and the wire 12. Therefore, signal interference between the touch control signal line 13 and the wire 12 can be reduced, and display performance and touch control performance of the touch control display panel 100 can in turn be enhanced.

The touch control display panel 100 further includes a touch control sensing block 15 and a touch control integrated circuit 16. The touch control sensing block 15 is disposed in the display area 10 and is disposed on the side of the wire 12 away from the substrate 11. The touch control signal line 13 and the touch control sensing block 15 are disposed on a same layer. The touch control integrated circuit 16 is disposed in the fan-out wire area 20. The touch control signal line 13 and the touch control sensing block 15 have a one-to-one correspondence. The touch control signal line 13 is connected to the touch control sensing block 15 and the touch control integrated circuit 16.

It can be understood that the touch control blocks 15 may be arranged in an array manner, wherein the touch control blocks 15 are arranged along two directions including a column direction and a row direction. Symbols M and N denote a number of sensing blocks arranged in the column direction and the row direction, respectively. M and N are positive integers, wherein, M may be 4 and N may be 5. The touch control integrated circuit 16 is configured to provide and detect a touch control signal, thereby realizing a touch control function of the display panel 100. The touch control signal line 13 and the touch control sensing block 15 may be disposed on a same layer or different layers. In the present disclosure, the touch control signal line 13 and the touch control sensing block 15 are disposed on a same layer, thereby saving one manufacturing process. As such, manufacturing processes of the touch control display panel 100 can be simplified.

When the at least one hollow part 14 is disposed at a lateral edge of the touch control signal line 13, a length D1 of the at least one hollow part 14 along an extending direction of the touch control signal line 13 is greater than or equal to a width W1 of the wire 12. When the at least one hollow part 14 is disposed at a lateral edge of the wire 12, a length of the at least one hollow part 14 along an extending direction of the wire 12 is greater than or equal to a width of the touch control signal line 13.

The touch control signal line 13 and the wire 12 overlap each other in the fan-shaped wire area 20, leading to signal interference between the touch control signal line 13 and the wire 12. Therefore, display performance and touch control performance of the touch control display panel 100 are affected. In the present disclosure, when the at least one hollow part 14 is disposed on a lateral edge of the touch control signal line 13, the length D1 of the at least one hollow part 14 along the extending direction of the touch control signal line 13 is greater than or equal to the width W1 of the wire 12. Therefore, the area of the overlapping area between the touch control signal line 13 and the wire 12 can be minimized. Thus, signal interference between the touch control signal line 13 and the wire 12 can be reduced, and display performance, and touch control performance of the touch control display panel 100 can in turn be enhanced.

Similarly, when the at least one hollow part 14 is disposed on the lateral edge of the wire 12, the length of the at least one hollow part 14 along the extending direction of the wire 12 is greater than or equal to the width of the touch control signal line 13. Therefore, the area of the overlapping area between the touch control signal line 13 and the wire 12 can be reduced. Thus, signal interference between the touch control signal line 13 and the wire 12 can be reduced, and display performance and touch control performance of the touch control display panel 100 can in turn be enhanced.

Figure 4:
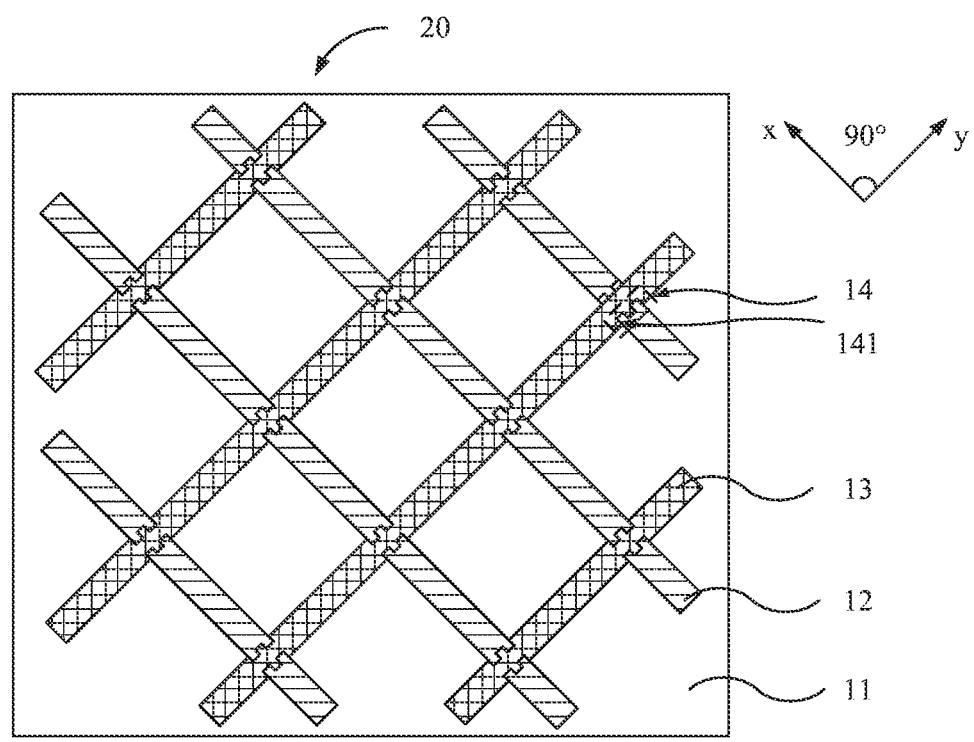
FIG. 4 is a partially enlarged view showing part of a touch control display panel provided by the present disclosure according to a second embodiment.

Please refer to FIG. 4. FIG. 4 is a partially enlarged view showing part of a touch control display panel provided by the present disclosure according to a second embodiment.

The hollow part 14 may include a plurality of sub-hollow parts 141. The sub-hollow parts 141 are disposed on the lateral edge of the touch control signal line 13 and arranged along the extending direction of the touch control signal line 13. Alternatively, the sub-hollows parts 141 are disposed on the lateral edge of the wire 12 and arranged along an extending direction of the wire 12. It can be understood that a number of the sub-hollow parts 141 may be one, two, three, four, or more. The number of the sub-hollow parts 141 is not limited. In the present disclosure, the number of the sub-hollow parts 141 is two.

The touch control signal line 13 and the wire 12 overlap each other in the fan-shaped wire area 20, leading to signal interference between the touch control signal line 13 and the wire 12. Therefore, display performance and touch control performance of the touch control display panel 100 are affected. In the present disclosure, the hollow part 14 is disposed on the overlapping area between the touch control signal line 13 and the wire 12 in the fan-out wire area 20. When the hollow part 14 is disposed on the lateral edge of the touch control line 13, the hollow part 14 includes the plurality of sub-hollow parts 141 disposed on the lateral edge of the touch control line 13 and arranged along the extending direction of the touch control signal line 13. Therefore, the area of the overlapping area between the touch control signal line 13 and the wire 12 can be reduced. Thus, signal interference between the touch control signal line 13 and the wire 12 can be reduced, and display performance and touch control performance of the touch control display panel 100 can in turn be enhanced. In addition, since the hollow part 14 includes the plurality of sub-hollow parts 141, a problem of large resistance due to reduction of an entire width of the touch control signal line 13 can be solved.

Similarly, when the hollow part 14 is disposed on the lateral edge of the wire 12. The hollow part 14 includes the plurality of sub-hollow parts 141 disposed on the lateral edge of the wire 12 and arranged along the extending direction of the wire. Therefore, the area of the overlapping area between the touch control signal line 13 and the wire 12 can be reduced. Thus, signal interference between the touch control signal line 13 and the wire 12 can be reduced, and display performance and touch control performance of the touch control display panel 100 can in turn be enhanced. In addition, the hollow part 14 includes the plurality of sub-hollow parts 141. Therefore, a problem of great resistance due to reduction of an entire width of the wire 12 can be solved.

Figure 5:
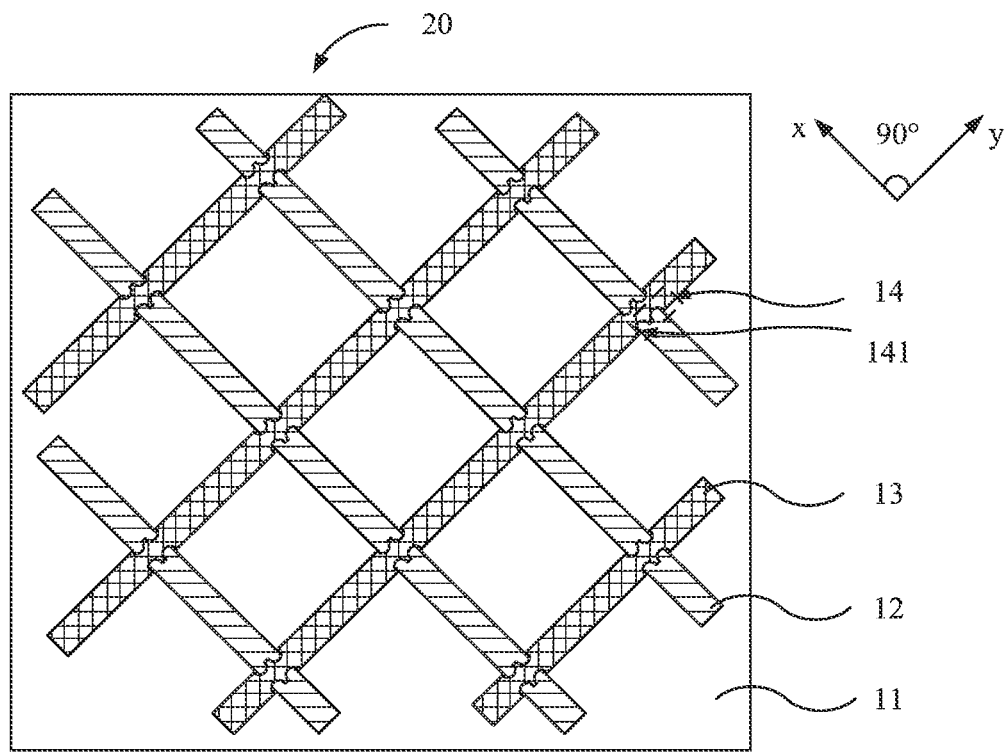
FIG. 5 is a partially enlarged view showing part of a touch control display panel provided by the present disclosure according to a third embodiment.

Please refer to FIG. 5. FIG. 5 is an enlarged view showing part of a touch control display panel provided by the present disclosure according to a third embodiment.

The hollow part 14 includes the plurality of sub-hollow parts 141. A shape of the sub-hollow parts 141 is a circular shape, an elliptical shape, or a regular polygonal shape. It should be noted that the shape of the sub-hollow parts 141 may also be a rectangular shape, a square shape, or a rhombic shape. In the present embodiment, the shape of the sub-hollow parts 141 is an ellipse. In the present disclosure, the shape of the sub-hollow parts 141 is not limited.

The touch control signal line 13 and the wire 12 overlap each other in the fan-shaped wire area 20, leading to signal interference between the touch control signal line 13 and the wire 12. Therefore, display performance and touch control performance of the touch control display panel 100 are affected. In the present disclosure, the hollow part 14 is disposed on the lateral edge of the touch control line 13 or the lateral edge of the wire 12. The hollow part 14 includes the plurality of sub-hollow parts 141. The shape of the sub-hollow parts 141 is an elliptical shape, a circular shape, or a regular polygonal shape. Therefore, the area of the overlapping area between the touch control signal line 13 and the wire 12 can be reduced. Thus, signal interference between the touch control signal line 13 and the wire 12 can be reduced, and display performance and touch control performance of the touch control display panel 100 can in turn be enhanced. In addition, since the hollow part 14 includes the plurality of sub-hollow parts 141, a problem of large resistance due to reduction of the entire width of the wire 12 or reduction of the entire width of the touch control signal line 13 can be solved.

Figure 6:
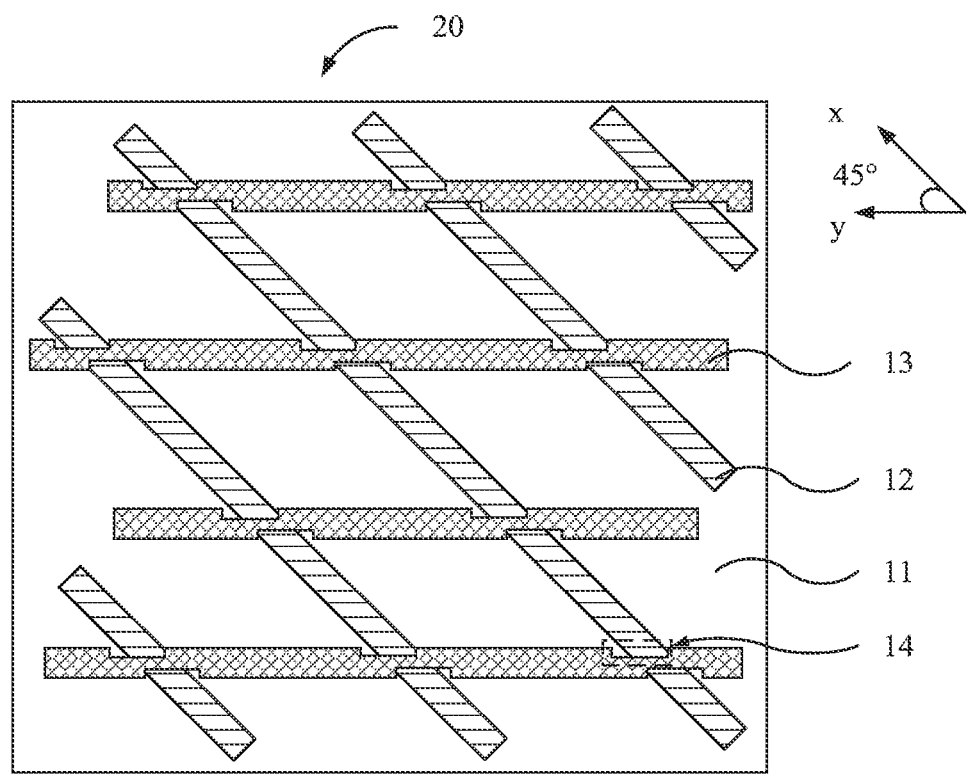
FIG. 6 is a partially enlarged view showing part of a touch control display panel provided by the present disclosure according to a fourth embodiment.

Please refer to FIG. 6. FIG. 6 is an enlarged view showing part of a touch control display panel provided by the present disclosure according to a fourth embodiment.

The wire 12 extends along a first direction x. The touch control signal line 13 extends along a second direction y. An angle between the first direction x and the second direction y ranges from 0° to 180°. Specifically, the angle between the first direction x and the second direction y is 0°, 10°, 20°, 30°, 40°, 45°, 50°, 60°, 70°, 80°, 90°, 100°, 110°, 120°, 130°, 135°, 140°, 150°, 160°, 170°, or 180°. It can be understood that a degree of overlap between the touch control signal line 13 and the wire 12 can be changed by adjusting the angle between the wire 12 and the touch control signal line 13. In the present embodiment, the angle between the first direction x and the second direction y is 45°. In the present disclosure, the angle between the wire 12 and the touch control signal line 13 is not limited.

The touch control signal line 13 and the wire 12 overlap each other in the fan-shaped wire area 20, leading to signal interference between the touch control signal line 13 and the wire 12. Therefore, display performance and touch control performance of the touch control display panel 100 are affected. In the present disclosure, the area of the overlapping area between the touch control signal line 13 and the wire 12 is reduced by changing an overlapping angle between the touch control signal line 13 and the wire 12. Therefore, signal interference between the touch control signal line 13 and the wire 12 can be reduced, and display performance and touch control performance of the touch control display panel 100 can in turn be enhanced.

Figure 7:
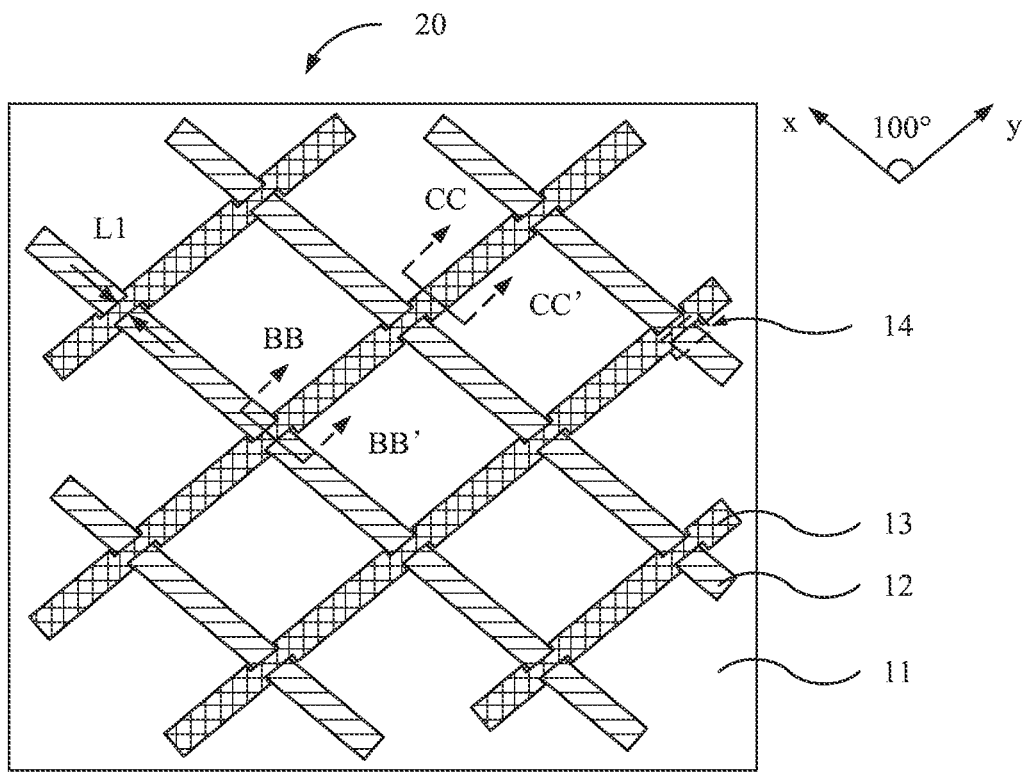
FIG. 7 is a partially enlarged view showing part of a touch control display panel provided by the present disclosure according to a fifth embodiment.

Please refer to FIG. 7. FIG. 7 is an enlarged view showing part of a touch control display panel provided by the present disclosure according to a fifth embodiment.

The wire 12 extends along the first direction x. The touch control signal line 13 extends along the second direction y. An angle between the first direction x and the second direction y is 100°.

The at least one hollow part 14 is plural. When the hollow parts 14 are disposed on two sides of the touch control signal line 13 respectively and are arranged opposite to each other, a vertical distance L1 between the corresponding hollow parts 14 along the extending direction of the touch control signal line 13 is greater than or equal to 2 μm. When the hollow parts 14 are disposed on two sides of the wire 12 respectively and is arranged opposite to each other, a vertical distance between the corresponding hollow parts 14 along the extending direction of the wire 12 is greater than or equal to 2 μm.

The touch control signal line 13 and the wire 12 overlap each other in the fan-shaped wire area 20, leading to signal interference between the touch control signal line 13 and the wire 12. Therefore, display performance and touch control performance of the touch control display panel 100 are affected. In the present disclosure, when the hollow parts 14 are disposed on two sides of the touch control signal line 13 respectively and are arranged opposite to each other, the vertical distance L1 between the corresponding hollow parts 14 along the extending direction of the touch control signal line 13 is greater than or equal to 2 μm. Therefore, the area of the overlapping area between the touch control signal line 13 and the wire 12 can be reduced. As such, signal interference between the touch control signal line 13 and the wire 12 can be reduced, and display performance and touch control performance of the display panel 100 can in turn be enhanced.

Similarly, when the hollow parts 14 are disposed on two sides of the wire 12 respectively and are arranged opposite to each other, the vertical distance between the corresponding hollow parts 14 along the extending direction of the wire 12 is greater than or equal to 2 μm. Therefore, the area of the overlapping area between the touch control signal line 13 and the wire 12 can be reduced. As such, signal interference between the touch control signal line 13 and the wire 12 can be reduced, and display performance and touch control performance of the display panel 100 can in turn be enhanced.

Figure 8:
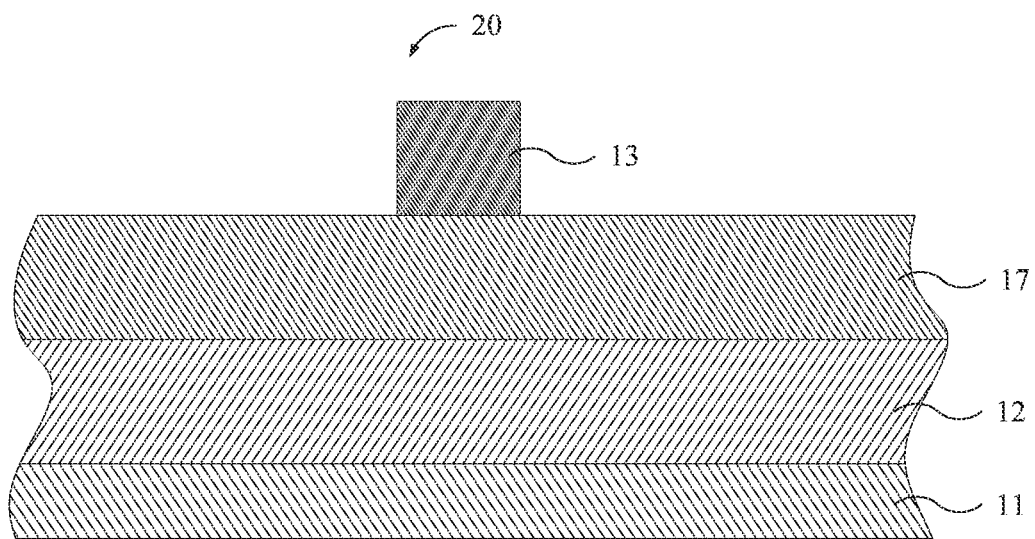
FIG. 8 is a cross-sectional view showing the touch control display panel provided by the present disclosure according to the fifth embodiment taken along line BB-BB'.
Figure 9:
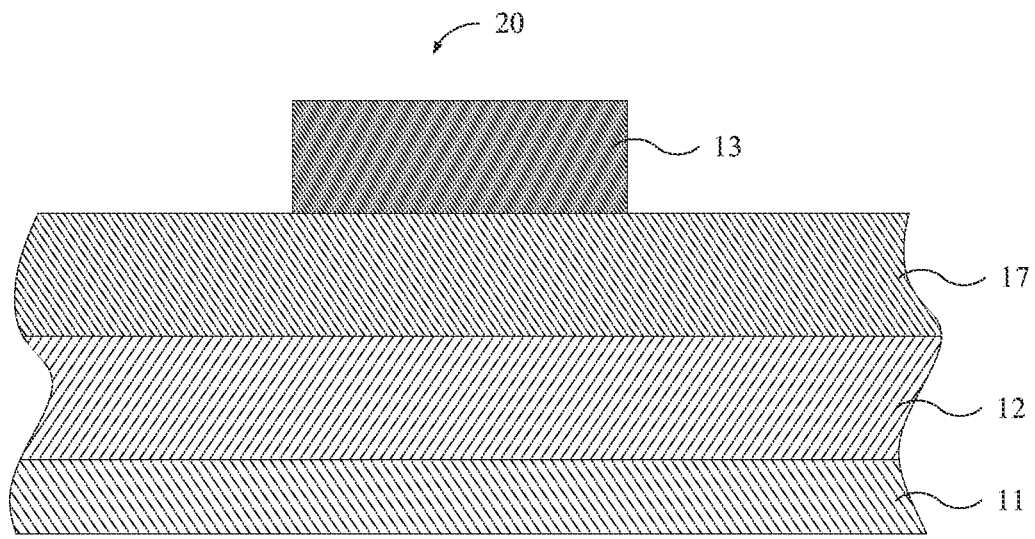
FIG. 9 is a cross-sectional view showing the touch control display panel provided by the present disclosure according to the fifth embodiment taken along line CC-CC'.

Please refer to FIGS. 8-9. FIG. 8 is a cross-sectional view showing the touch control display panel provided by the present disclosure according to the fifth embodiment taken along line BB-BB'. FIG. 9 is a cross-sectional view showing the touch control display panel provided by the present disclosure according to the fifth embodiment taken along line CC-CC'.

The touch control display panel 100 further includes an insulating layer 17. The insulating layer 17 is disposed between the wire 12 and the touch control signal line 13. A thickness of the insulating layer 17 may range from 1 to 3 μm. Specifically, the thickness of the insulating layer 17 may be 1 μm, 1.5 μm, 2 μm, 2.5 μm, or 3 μm. The insulating layer 17 may be made of an inorganic material or an organic material. In the present disclosure, the insulating layer 17 is made of an inorganic material. Specifically, the insulating layer 17 is made of SiNx. Wherein, a width of the touch control signal line 13 in the overlapping area ranges from 2 to 5 μm. Specifically, the width of the touch control signal line 13 in the overlapping area may be 2 μm, 3 μm, 4 μm, or 5 μm. A width of the touch control signal line 13 in a non-overlapping area ranges from 3 to 30 μm. It can be understood that the width of the touch control signal line 13 in the non-overlapping area may be 3 μm, 10 μm, 15 μm, 20 μm, 25 μm, or 30 μm. Since the width of the touch control signal line 13 in the non-overlapping area ranges from 3 to 30 μm, an aperture ratio of the touch control display panel 100 can be increased.

The insulating layer 17 is disposed between the wire 12 and the touch control signal line 13. Therefore, when the touch control signal line 13 is formed by etching a metal layer, the insulating layer 17 can protect the wire 12 from being damaged. In addition, the wire 12 and the touch control signal line 13 are near, and a signal-shielding layer is not disposed therebetween. Therefore, by disposing the insulating layer 17 between the wire 12 and the touch control signal line 13, a signal between the wire 12 and the touch control signal line 13 can be shielded, and a distance between the wire 12 and the touch control signal line 13 can be increased. Therefore, signal interference between the touch control signal line 13 and the wire 12 can be reduced, and display performance and touch control performance of the display panel 100 can in turn be enhanced.

Figure 10:
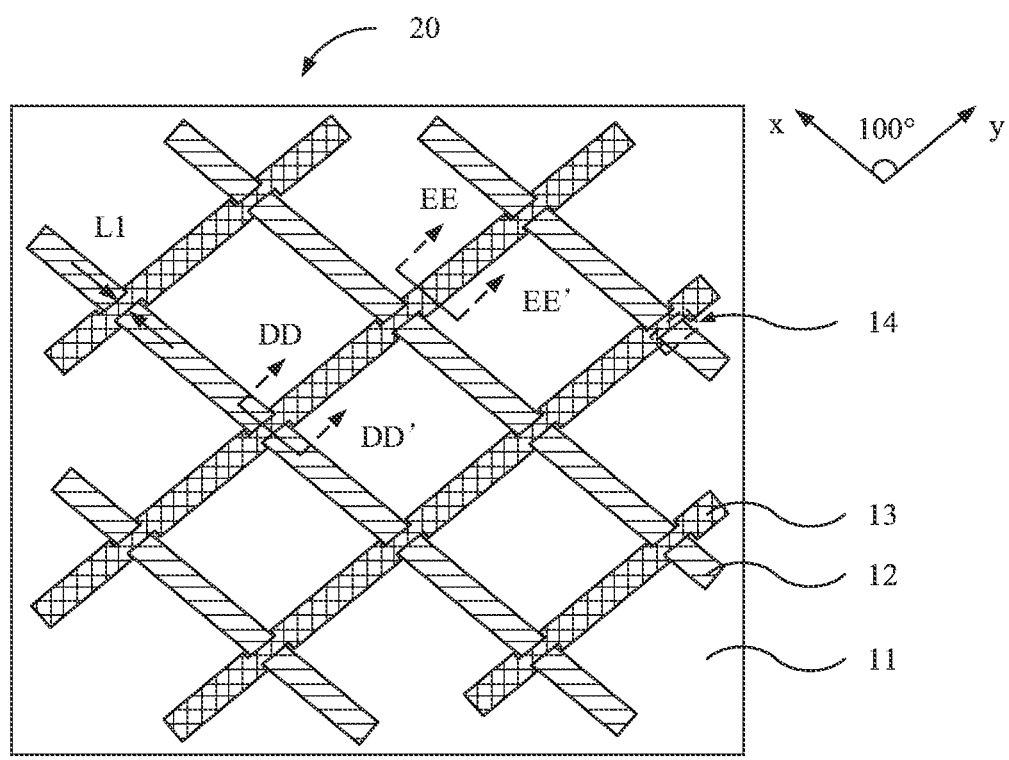
FIG. 10 is a partially enlarged view showing part of a touch control display panel provided by the present disclosure according to a sixth embodiment.
Figure 11:
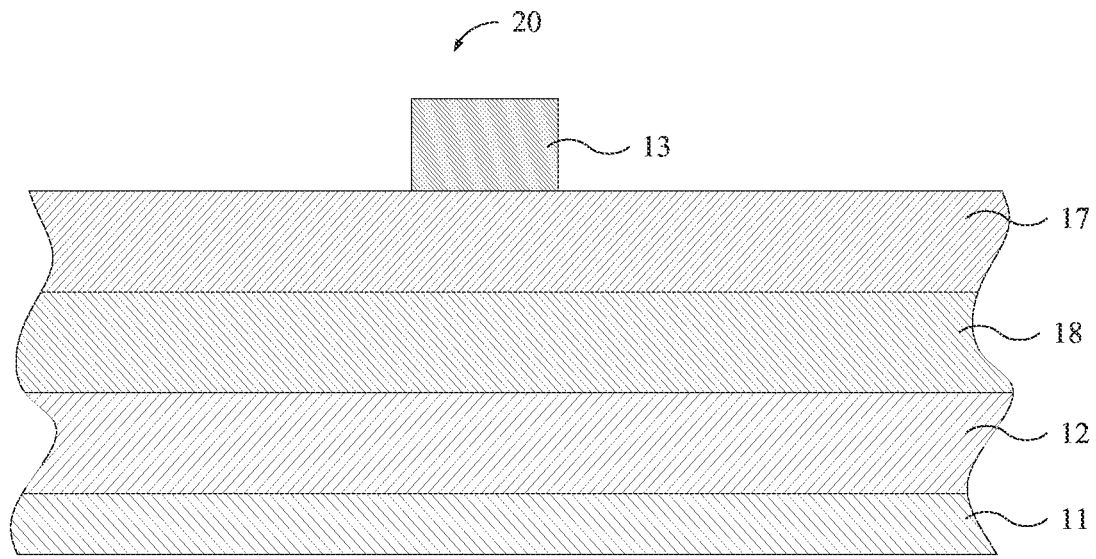
FIG. 11 is a cross-sectional view showing the touch control display panel provided by the present disclosure according to the sixth embodiment taken along line DD-DD'.
Figure 12:
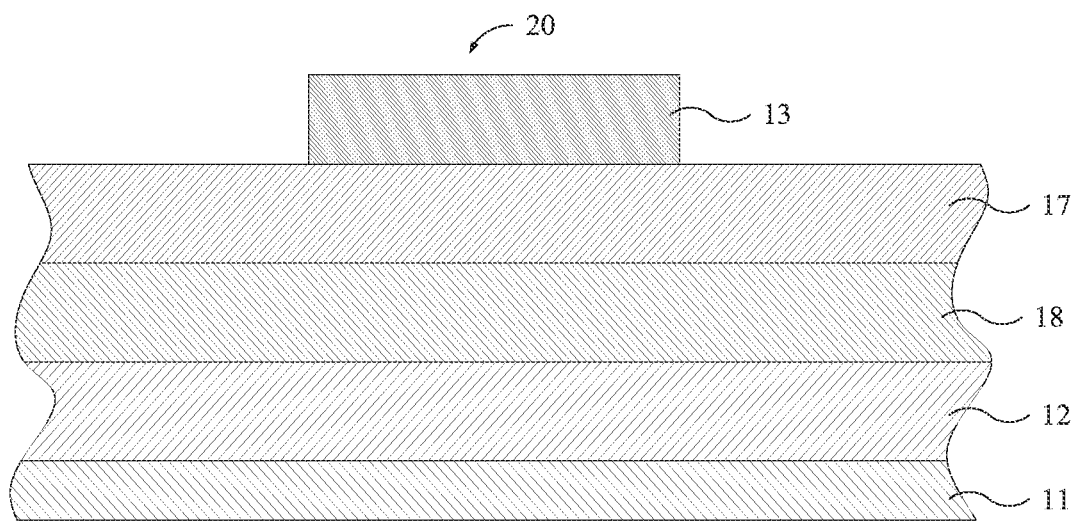
FIG. 12 is a cross-sectional view showing the touch control display panel provided by the present disclosure according to the sixth embodiment taken along line EE-EE'.

Please refer to FIGS. 10-12. FIG. 10 is an enlarged view showing part of a touch control display panel provided by the present disclosure according to a sixth embodiment. FIG. 11 is a cross-sectional view showing the touch control display panel provided by the present disclosure according to the sixth embodiment taken along line DD-DD'. FIG. 12 is a cross-sectional view showing the touch control display panel provided by the present disclosure according to the sixth embodiment taken along line EE-EE'.

The touch control display panel 100 further includes an encapsulation layer 18. The encapsulation layer 18 is disposed between the wire 12 and the insulating layer 17. A thickness of the encapsulation layer 18 may range from 3 μm to 5 μm. Specifically, the thickness of the encapsulation layer 18 may be 3 μm, 4 μm, or 5 μm. The encapsulation layer 18 may have a stacked structure formed from organic materials and inorganic materials which are alternately disposed. In the present disclosure, a structure of the encapsulation layer 18 is not limited. Wherein, the width of the touch control signal line 13 in the overlapping area ranges from 2 to 5 μm. Specifically, the width of the touch control signal line 13 in the overlapping area may be 2 μm, 3 μm, 4 μm, or 5 μm. The width of the touch control signal line 13 in the non-overlapping area ranges from 3 to 30 μm. Specifically, the width of the touch control signal line 13 in the non-overlapping area may be 3 μm, 10 μm, 15 μm, 20 μm, 25 μm, or 30 μm. Since the width of the touch control signal line 13 in the non-overlapping area ranges from 3 to 30 μm, an aperture ratio of the touch control display panel 100 can be increased.

In the touch control display panel 100, the wire 12 may be made of metal materials such as Cu/Mo, Cu/Mo/Nd, Cu/Mo/Ti, or Cu/Ti. Therefore, the wire 12 is easily affected by external moisture, thereby affecting display performance of the display panel 100. In the present disclosure, the encapsulation layer 18 is disposed on the side of the wire 12 away from the substrate 11, thereby preventing the wire 12 from being affected by external moisture. In addition, by disposing the encapsulation layer 18 between the wire 12 and the insulating layer 17 as well as disposing the insulating layer between the wire 12 and the touch control signal line 13, not only can a signal between the wire 12 and the touch control signal line 13 be shielded, but also the distance between the wire 12 and the touch control signal line 13 can be increased. Therefore, signal interference between the touch control signal line 13 and the wire 12 can be reduced, and display performance and touch control performance of the display panel 100 can in turn be enhanced. It can be understood that a capacitance calculation formula is as follows: C=εS/(4πkd), wherein s is a dielectric constant of a medium between two electrodes, S is the facing area of the two plates of the capacitor, π is Pi, and d is a distance between the two plates of the capacitor. According to the above-mentioned capacitance calculation formula, the less the s, the less the C, and the greater the d, the less the C. Therefore, C can be reduced by reducing s or increasing d. As such, by disposing the encapsulation layer between the touch control signal line 13 and the wire 12, the coupling capacitance between the touch control signal line 13 and the wire 12 can be further reduced. As such, signal interference between the touch control signal line 13 and the wire 12 can be reduced, and display performance and touch control performance of the display panel 100 can in turn be enhanced.

Figure 13:
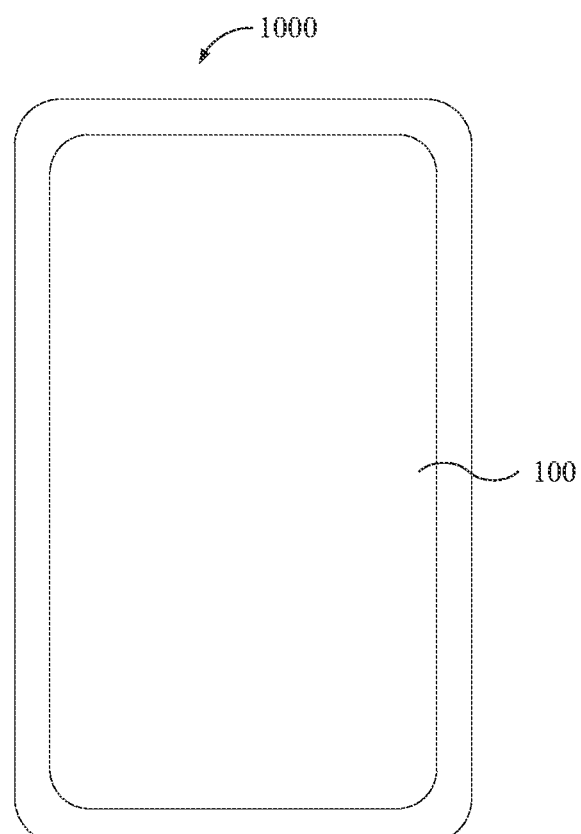
FIG. 13 is a plan structural schematic view showing a touch control display device provided by the present disclosure.

Please refer to FIG. 13. FIG. 13 is a plan structural schematic view showing a touch control display device provided by the present disclosure.

A touch control display device 1000 includes the touch control display panels 100 of any one of the above-mentioned embodiments. Specifically, the touch control display device 1000 may be a display device having a touch control function such as a cell phone, a tablet computer, a notebook computer, a game console, a digital camera, a car navigation system, an electronic billboard, or an automated teller machine (ATM).

In the touch control display panel, the touch control signal line overlaps the wire in the fan-shaped wire area. Signal interference occurs between the touch control signal line and the wire, affecting display performance and touch control performance of the touch control display panel. In the present disclosure, the overlapping area between the touch control signal and the wire includes the at least one hollow part configured to reduce the area of the overlapping area between the touch control signal line and the wire and increase the distance between the touch control signal line and the wire. Therefore, signal interference between the touch control signal line and the wire can be reduced, and display performance and touch control performance of the touch control display panel can in turn be enhanced.

In summary, the present disclosure has been described with preferred embodiments thereof. The preferred embodiments are not intended to limit the present disclosure, and it is understood that many changes and modifications to the described embodiments can be carried out without departing from the scope and the spirit of the disclosure that is intended to be limited only by the appended claims.

What is claimed is:

1. A touch control display panel, comprising a display area and a fan-shaped wire area defined at an end of the display area, wherein the touch control display panel comprises:
 a substrate;
 a wire disposed on a side of the substrate, wherein part of the wire is disposed in the fan-shaped wire area; and
 a touch control signal line disposed on a side of the wire away from the substrate, wherein part of the touch control signal line is disposed in the fan-shaped wire area, and the touch control signal line overlaps the wire in the fan-shaped wire area;
 wherein an overlapping area between the touch control signal line and the wire comprises at least one hollow part configured to reduce an area of the overlapping area between the touch control signal line and the wire.

2. The touch control display panel of claim 1, wherein when the at least one hollow part is disposed at a lateral edge of the touch control signal line, a length of the at least one hollow part along an extending direction of the touch control signal line is greater than or equal to a width of the wire; and
 when the at least one hollow part is disposed at a lateral edge of the wire, a length of the at least one hollow part along an extending direction of the wire is greater than or equal to a width of the touch control signal line.

3. The touch control display panel of claim 1, wherein the at least one hollow part comprises a plurality of sub-hollow parts disposed at a lateral edge of the touch control signal line and arranged along an extending direction of the touch control signal line; or
 the sub-hollow parts are disposed at a lateral edge of the wire and arranged along an extending direction of the wire.

4. The touch control display panel of claim 3, wherein a shape of the sub-hollow parts is a circular shape, an elliptical shape, or a regular polygonal shape.

5. The touch control display panel of claim 1, wherein an extending direction of the wire is a first direction, an extending direction of the touch control signal line is a second direction, and an angle between the first direction and the second direction ranges from 0° to 180°.

6. The touch control display panel of claim 1, wherein when the hollow parts are disposed at two sides of the touch control signal line respectively and are arranged opposite to each other, a vertical distance between the corresponding hollow parts along an extending direction of the touch control signal line is greater than or equal to 2 μm; and
 when the hollow parts are disposed at two sides of the wire respectively and are arranged opposite to each other, a vertical distance between the corresponding hollow parts along an extending direction of the wire is greater than or equal to 2 μm.

7. The touch control display panel of claim 1, wherein the wire is a data signal line, a driving signal line, or a gate timing control line.

8. The touch control display panel of claim 1, further comprising an insulating layer disposed between the wire and the touch control signal line.

9. The touch control display panel of claim 8, further comprising an encapsulation layer disposed between the wire and the insulating layer.

10. The touch control display panel of claim 1, further comprising a touch control sensing block and a touch control integrated circuit, wherein the touch control sensing block is disposed in the display area and is disposed on the side of the wire away from the substrate, the touch control signal line and the touch control sensing block are disposed on a same layer, the touch control integrated circuit is disposed in the fan-shaped wire area, the touch control signal line and the touch control sensing block have a one-to-one correspondence, and the touch control signal line is connected to the touch control sensing block and the touch control integrated circuit.

11. A touch control display device, comprising a touch control display panel, wherein the touch control display panel comprises a display area and a fan-shaped wire area defined at an end of the display area, and the touch control display panel comprises:
- a substrate;
- a wire disposed on a side of the substrate, wherein part of the wire is disposed in the fan-shaped wire area; and
- a touch control signal line disposed on a side of the wire away from the substrate, wherein part of the touch control signal line is disposed in the fan-shaped wire area, and the touch control signal line overlaps the wire in the fan-shaped wire area;
- wherein an overlapping area between the touch control signal line and the wire comprises at least one hollow part configured to reduce an area of the overlapping area between the touch control signal line and the wire.

12. The touch control display device of claim 11, comprising the touch control display panel;
- wherein when the at least one hollow part is disposed at a lateral edge of the touch control signal line, a length of the at least one hollow part along an extending direction of the touch control signal line is greater than or equal to a width of the wire; and
- when the at least one hollow part is disposed at a lateral edge of the wire, a length of the at least one hollow part along an extending direction of the wire is greater than or equal to a width of the touch control signal line.

13. The touch control display device of claim 11, comprising the touch control display panel;
- wherein the at least one hollow part comprises a plurality of sub-hollow parts disposed at a lateral edge of the touch control signal line and arranged along an extending direction of the touch control signal line; or
- the sub-hollow parts are disposed at a lateral edge of the wire and arranged along an extending direction of the wire.

14. The touch control display device of claim 13, comprising the touch control display panel, wherein a shape of the sub-hollow parts is a circular shape, an elliptical shape, or a regular polygonal shape.

15. The touch control display device of claim 11, comprising the touch control display panel, wherein an extending direction of the wire is a first direction, an extending direction of the touch control signal line is a second direction, and an angle between the first direction and the second direction ranges from 0° to 180°.

16. The touch control display device of claim 11, comprising the touch control display panel;
- wherein when the hollow parts are disposed at two sides of the touch control signal line respectively and are arranged opposite to each other, a vertical distance between the corresponding hollow parts along an extending direction of the touch control signal line is greater than or equal to 2 µm; and
- when the hollow parts are disposed at two sides of the wire respectively and are arranged opposite to each other, a vertical distance between the corresponding hollow parts along an extending direction of the wire is greater than or equal to 2 µm.

17. The touch control display device of claim 11, comprising the touch control display panel, wherein the wire is a data signal line, a driving signal line, or a gate timing control line.

18. The touch control display device of claim 11, comprising the touch control display panel, wherein the touch control display panel further comprises an insulating layer disposed between the wire and the touch control signal line.

19. The touch control display device of claim 18, comprising the touch control display panel, wherein the touch control display panel further comprises an encapsulation layer disposed between the wire and the insulating layer.

20. The touch control display device of claim 11, comprising the touch control display panel, wherein the touch control display panel further comprises a touch control sensing block and a touch control integrated circuit, the touch control sensing block is disposed in the display area and is disposed on the side of the wire away from the substrate, the touch control signal line and the touch control sensing block are disposed on a same layer, the touch control integrated circuit is disposed in the fan-shaped wire area, the touch control signal line and the touch control sensing block have a one-to-one correspondence, and the touch control signal line is connected to the touch control sensing block and the touch control integrated circuit.

* * * * *